United States Patent
Hasegawa et al.

(10) Patent No.: US 9,166,841 B2
(45) Date of Patent: Oct. 20, 2015

(54) RECEIVING APPARATUS AND RECEIVING METHOD

(75) Inventors: Fumihiro Hasegawa, Tokyo (JP); Hiroshi Nishimoto, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/394,187

(22) PCT Filed: May 14, 2012

(86) PCT No.: PCT/JP2012/062305
§ 371 (c)(1),
(2), (4) Date: Oct. 13, 2014

(87) PCT Pub. No.: WO2013/171823
PCT Pub. Date: Nov. 21, 2013

(65) Prior Publication Data
US 2015/0117509 A1 Apr. 30, 2015

(51) Int. Cl.
*H04B 1/10* (2006.01)
*H04L 25/08* (2006.01)
*H04L 25/06* (2006.01)
*H04L 27/26* (2006.01)
(Continued)

(52) U.S. Cl.
CPC .......... *H04L 25/085* (2013.01); *H04L 25/0204* (2013.01); *H04L 25/067* (2013.01); *H04L 27/01* (2013.01); *H04L 27/265* (2013.01); *H04L 27/2636* (2013.01); *H04L 27/2647* (2013.01); *H04L 27/2649* (2013.01)

(58) Field of Classification Search
CPC . H04L 25/00; H04L 25/0202; H04L 25/0208; H04L 25/0256; H04L 25/0258; H04L 25/0264; H04L 25/0268; H04L 1/00; H04L 1/004; H04L 1/0045; H04L 1/0057
USPC ........ 375/229, 230, 232, 259, 260, 285, 316, 375/340, 342, 346, 350
See application file for complete search history.

(56) References Cited

U.S. PATENT DOCUMENTS

| | | | |
|---|---|---|---|
| 2006/0120270 A1* | 6/2006 | Han et al. ...................... | 370/208 |
| 2009/0052427 A1* | 2/2009 | Oketani et al. ................ | 370/347 |
| 2009/0125793 A1* | 5/2009 | Kishigami et al. ............ | 714/794 |

(Continued)

FOREIGN PATENT DOCUMENTS

| | | |
|---|---|---|
| EP | 2 385 664 A1 | 11/2011 |
| JP | 2000-228657 | 8/2000 |

(Continued)

OTHER PUBLICATIONS

PCT/JP2011/069656 by Hasegawa, published on Apr. 19, 2012.*

(Continued)

*Primary Examiner* — Siu Lee
(74) *Attorney, Agent, or Firm* — Oblon, McClelland, Maier & Neustadt, L.L.P.

(57) ABSTRACT

A receiving apparatus includes a channel estimating unit that performs channel estimation by using a reception signal and obtains a channel estimation value, a demodulation processing unit that performs demodulation processing by using the channel estimation value and the reception signal, a weight calculating unit that calculates weight for decoding for each of channels by using the channel estimation value, and a decoding unit that performs decoding processing by using the weight and a result of the demodulation processing.

20 Claims, 8 Drawing Sheets

(51) Int. Cl.
*H04L 25/02* (2006.01)
*H04L 27/01* (2006.01)

(56) References Cited

U.S. PATENT DOCUMENTS

| 2010/0189162 | A1* | 7/2010 | Yoshimoto et al. | 375/141 |
| 2012/0093272 | A1* | 4/2012 | Kimata | 375/348 |
| 2013/0170524 | A1* | 7/2013 | Hasegawa | 375/211 |

FOREIGN PATENT DOCUMENTS

| JP | 2003-258758 | 9/2003 |
| JP | 2007-336532 | 12/2007 |
| JP | 2008-010987 | 1/2008 |
| JP | 2009-278658 | 11/2009 |
| JP | 2010-056597 | 3/2010 |
| JP | 2011-055561 | 3/2011 |
| JP | 2012-074965 | 4/2012 |
| WO | 2009/011126 | 1/2009 |

OTHER PUBLICATIONS

International Search Report issued Jun. 19, 2012, in PCT/JP12/062305, filed May 14, 2012.
Benvenuto, N. et al., "Single Carrier Modulation With Nonlinear Frequency Domain Equalization: An Idea Whose Time Has Come-again", Proceedings of the IEEE, vol. 98, No. 1, pp. 69-96, 2010.
Bingham, John A. C., "Multicarrier Modulation for Data Transmission: An Idea Whose Time Has Come", IEEE Communications Magazine, vol. 28, No. 5, pp. 5-14, 1990.
McCloud, M. L., et al., "Analysis and Design of Short Block OFDM Spreading Matrices for Use on Multipath Fading Channels", IEEE Transactions on Communications, vol. 53, No. 4, pp. 656-665, 2005.
Office Action issued Jan. 20, 2015 in Japanese Patent Application No. 2014-515367 (with English translation).

* cited by examiner

(1) CALCULATE WEIGHT OF SYMBOL INCLUDING PILOT SYMBOL (2) CALCULATE WEIGHT OF SYMBOL INCLUDING ONLY DATA SYMBOL ACCORDING TO INTERPOLATION

RECEIVING APPARATUS AND RECEIVING METHOD

FIELD

The present invention relates to a receiving apparatus and a receiving method.

BACKGROUND

In a digital communication system, frequency selectivity and time fluctuation of a transmission line occur because of multipath fading caused by reflection of a transmission signal on a building or the like and Doppler fluctuation caused by movement of a terminal. In such a multipath environment, a reception signal is a signal in which a transmission symbol and a symbol reaching after a delay time interfere with each other.

A single carrier block transmission system for obtaining a best reception characteristic in such a transmission line having the frequency selectivity attracts attention in recent years (see, for example, Non Patent Literature 1 described below). In the single carrier (SC) block transmission system, peak power can be set low compared with an OFDM (Orthogonal Frequency Division Multiplexing) transmission system (see, for example, Non Patent Literature 2 described below), which is a multiple carrier (MC) block transmission.

In a transmitter that performs SC block transmission, for example, a measure against the multipath fading is taken by performing transmission explained below. First, a PSK (Phase Shift Keying) signal and QAM (Quadrature Amplitude Modulation) signal, which are digital modulation signals, are generated in a "Modulator". Then, the digital modulation signals are converted into time domain signals by a pre-coder and an IDFT (Inverse Discrete Fourier Transform) processing unit. The PSK and QAM signals are generated by bit sequences generated using an interleaver that arranges the bit sequences in discontinuous forms of error correction codes and bits in times, frequencies, and the like. As the error correction codes, there are a convolutional code, a turbo code, an LDPC (Low Density Parity Check) code, and the like, which are generally used. Thereafter, as a measure against the multipath fading, a CP is inserted in a CP (Cyclic Prefix) inserting unit. The CP inserting unit copies a predetermined number of samples after the time domain signals and adds the samples to the beginning of a transmission signal. Besides, as a measure against the multipath fading, ZP (zero padding) for inserting zero in a portion of the beginning or the end of data is performed.

To suppress transmission peak power, in the transmitter that performs the SC transmission, in general, DFT (Discrete Fourier Transform) processing is performed by the pre-coder. Besides, there is also an example in which a pre-coder or the like employing a unitary matrix is used (see, for example, Non Patent Literature 3 described below).

CITATION LIST

Non Patent Literature

Non Patent Literature 1: N. Benvenuto, R. Dinis, D. Falconer and S. Tomasin, "Single carrier modulation with nonlinear frequency domain equalization: an idea whose time has come—again", Proceeding of the IEEE, vol. 98, no. 1, January 2010, pp. 69-96.

Non Patent Literature 2: J. A. C. Bingham, "Multicarrier modulation for data transmission: an idea whose time has come", IEEE Commun. Mag., vol. 28, no. 5, May 1990, pp. 5-14.

Non Patent Literature 3: M. L. McCloud, "Analysis and design of short block OFDM spreading matrices for use on multipath fading channels", IEEE Trans. On Commun., vol. 53, no. 4, April 2005, pp. 656-665.

SUMMARY

Technical Problem

According to the technology of the SC transmission in the past, the peak transmission power is suppressed while reducing the influence of the multipath fading. However, it is likely that a decoding result is deteriorated in an environment in which transmission line fluctuation is conspicuous.

The present invention has been devised in view of the above and it is an object of the present invention to obtain a receiving apparatus that can improve a decoding characteristic.

Solution to Problem

The present invention is directed to a receiving apparatus that achieves the object. The receiving apparatus includes a transmission-line estimating unit that performs transmission line estimation by using a reception signal and obtains a transmission line estimation value; a demodulation processing unit that performs demodulation processing by using the transmission line estimation value and the reception signal; a weight calculating unit that calculates weight for decoding for each of transmission lines by using the transmission line estimation value; and a decoding unit that performs decoding processing by using the weight and a result of the demodulation processing.

Advantageous Effects of Invention

A receiving apparatus and a receiving method according to the present invention have an effect that it is possible to improve a decoding characteristic.

DESCRIPTION OF EMBODIMENTS

Embodiments of a receiving apparatus and a receiving method according to the present invention are explained in detail below with reference to the drawings. Note that the present invention is not limited by the embodiments.

First Embodiment

Figure 1:
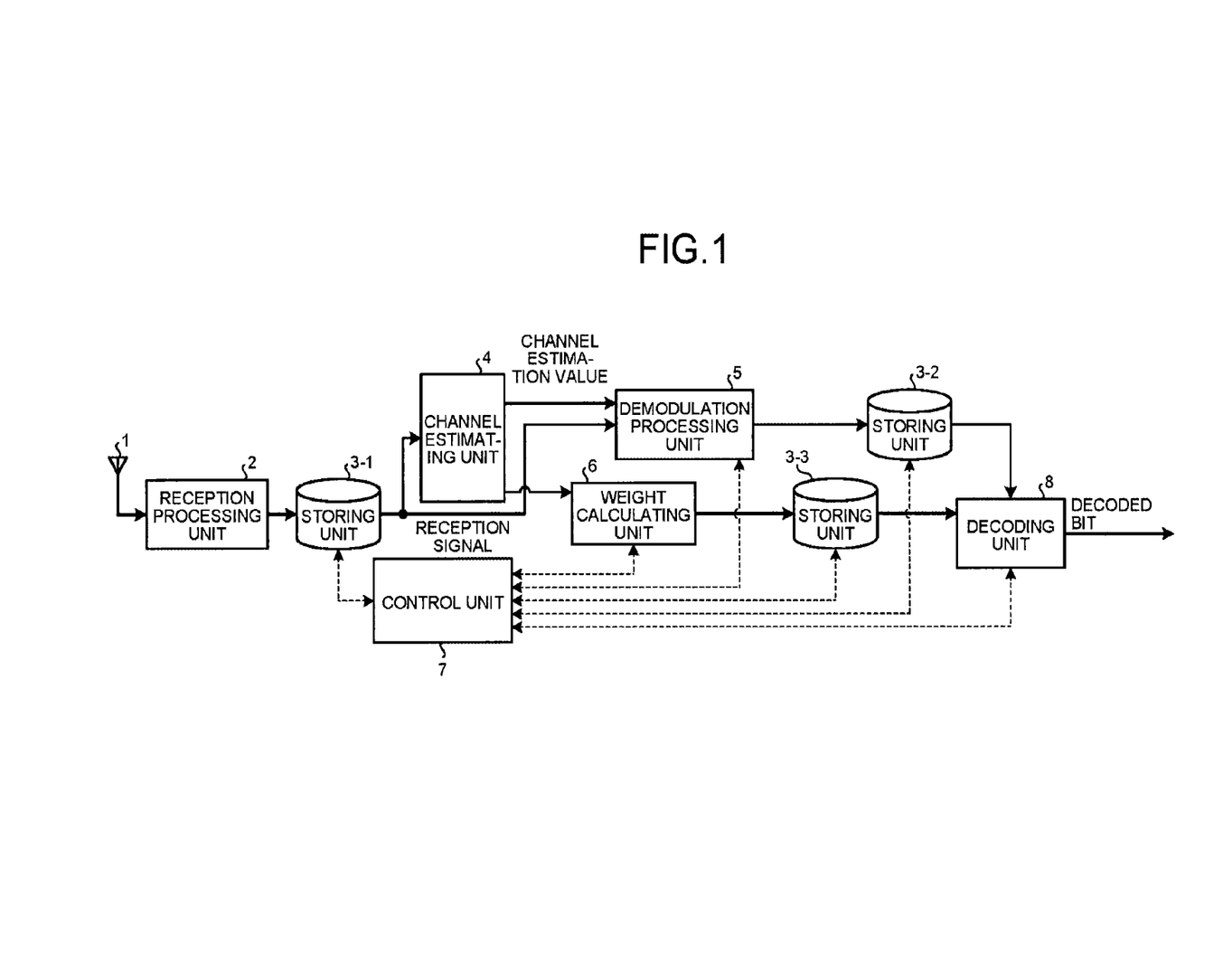
FIG. 1 is a diagram of a functional configuration example of a receiving apparatus in a first embodiment.

FIG. 1 is a diagram of a functional configuration example of a first embodiment of the receiving apparatus according to the present invention. As shown in FIG. 1, the receiving apparatus in this embodiment includes a reception antenna 1, a reception processing unit 2, storing units 3-1, 3-2, and 3-3, a transmission-line estimating unit 4, a demodulation processing unit 5, a weight calculating unit 6, a control unit 7, and a decoding unit 8.

A reception signal received from the reception antenna 1 is input to the reception processing unit 2. After being subjected to predetermined reception processing by the reception processing unit 2, the reception signal is accumulated in the storing unit 3-1 (a reception-signal storing unit). The reception signal accumulated in the storing unit 3-1 is input to the transmission-line estimating unit 4 and the demodulation processing unit 5 according to a control signal from the control unit 7. The transmission-line estimating unit 4 carries out transmission line estimation using the input reception signal and inputs a transmission line estimation value to the demodulation processing unit 5 and the weight calculating unit 6.

The demodulation processing unit 5 carries out demodulation processing using the input reception signal and the transmission line estimation value. A demodulated signal is accumulated in the storing unit 3-2 (a demodulated-signal storing unit). The weight calculating unit 6 calculates weight (weight for decoding) using the input transmission line estimation value. The weight is accumulated in the storing unit 3-3 (a weight storing unit). The decoding unit 8 performs decoding processing on the basis of the demodulated signal accumulated in the storing unit 3-2 and the weight accumulated in the storing unit 3-3. When an interleaves is used on a transmission side in the decoding processing, a deinterleaver is used to return a bit arrangement to an original position.

The processing of the units is explained in detail below. The transmission-line estimating unit 4 performs transmission line estimation using the reception signal output from the storing unit 3-1. In general, a known signal (hereinafter referred to as pilot signal) is included in the reception signal. Therefore, in this case, the transmission-line estimating unit 4 extracts the reception signal including the pilot signal and performs the transmission line estimation. Note that, in this embodiment, any method can be used as a transmission-line estimating method. The pilot signal does not have to be used.

The demodulation processing unit 5 performs demodulation using the transmission line estimation value and the reception signal. In this embodiment, as the demodulation processing, any method can be used.

The decoding unit 8 performs decoding using, for example, an LLR (Log Likelihood Ratio) during decoding. The LLR for bits can be calculated using Formula (1) below. For example, when x is a value of +1 or −1, the LLR is a value obtained by calculating a logarithm (log) of a ratio between a probability that x is +1 and a probability that x is −1.

[Math. 1]

$$LLR = \log\left(\frac{p(x=+1)}{p(x=-1)}\right) \tag{1}$$

Note that $p(x=+1)$ represents the probability that x is +1 and $p(x=-1)$ represents the probability that x is −1. When a value of LLR is larger than 0, it is determined that x=+1. When the value is smaller than 0, it is determined that x=−1. As an example, it is assumed that there are three random numbers x0, x1, and x2 and each of the random numbers is +1 or −1. In this case, the LLR for each of the random numbers is defined as indicated by Formula (2) below. In the formula, i is an integer satisfying a relation 0≤i≤2.

[Math. 2]

$$LLR_i = \log\left(\frac{p(x_i=+1)}{p(x_i=-1)}\right) \quad 0 \leq i \leq 2 \tag{2}$$

When $w_i$ is defined as ith weight (weight for decoding), in the case of Formula (2), the LLR after weighting is Formula (3) below.

[Math. 3]

$$LLR_i = \log\left(\frac{p(x_i=+1)}{p(x_i=-1)}\right) \cdot w_i \quad 0 \leq i \leq 2 \tag{3}$$

In this way, a weighted LLR value can be generated. The weight is calculated on the basis of the transmission line estimation value to be a high value at time and a frequency with high reliability. Therefore, reliability of the LLR value is higher as the weight is larger. The random numbers are explained above. However, if $x_i$ represents a reception signal corresponding to time i (in this case, i is not limited to 0≤i≤2) and weight for the reception signal is generated as weight according to the transmission line estimation value and used as the weight explained above, the reliability can be given according to the magnitude of the weight. Therefore, the reliability of the LLR value is improved and the decoding characteristic is improved. Note that a generation method for weight can be any generation method as long as weight is generated according to the transmission line estimation value. By generating weight according to the transmission line estimation value, in a transmission line in which time fluctuation is conspicuous, it is possible to create weight that fluctuates together with the time i. A normalized value can be used as the weight.

The storing units 3-1 to 3-3 are used to respectively store reception signals, demodulated signals, and weights. Volumes that the storing units 3-1 to 3-3 can respectively store can be different depending on data amounts to be stored. Data outputs from the storing units 3-1 to 3-3 and recording timings in the storing units 3-1 to 3-3 are limited by the control unit 7. For example, while the transmission-line estimating unit 4, the weight calculating unit 6, and the demodulation processing unit 5 are operating, the control unit 7 controls, with a control signal, the storing unit 3-1 to be capable of storing the reception signal. For example, when the demodulated signals and the weights are respectively stored in the storing units 3-2 and 3-3 to some degrees, the control unit 7 controls, with the control signal, the storing units 3-2 and 3-3 to respectively output the weights and transmission line estimation values. The storing units 3-1 to 3-3 also have a function of feeding back to the control unit 7 how large data amounts are accumulated or read out.

Note that the capacities of the storing units 3-2 and 3-3 are set to be, for example, equal to or larger than capacities enough for storing data that can be decoded in the decoding unit 8. The storing unit 3-1 only has to have a capacity enough for storing the reception signal output from the reception processing unit 2 during the transmission line estimation, the demodulation processing, and the weight calculation.

Figure 2:
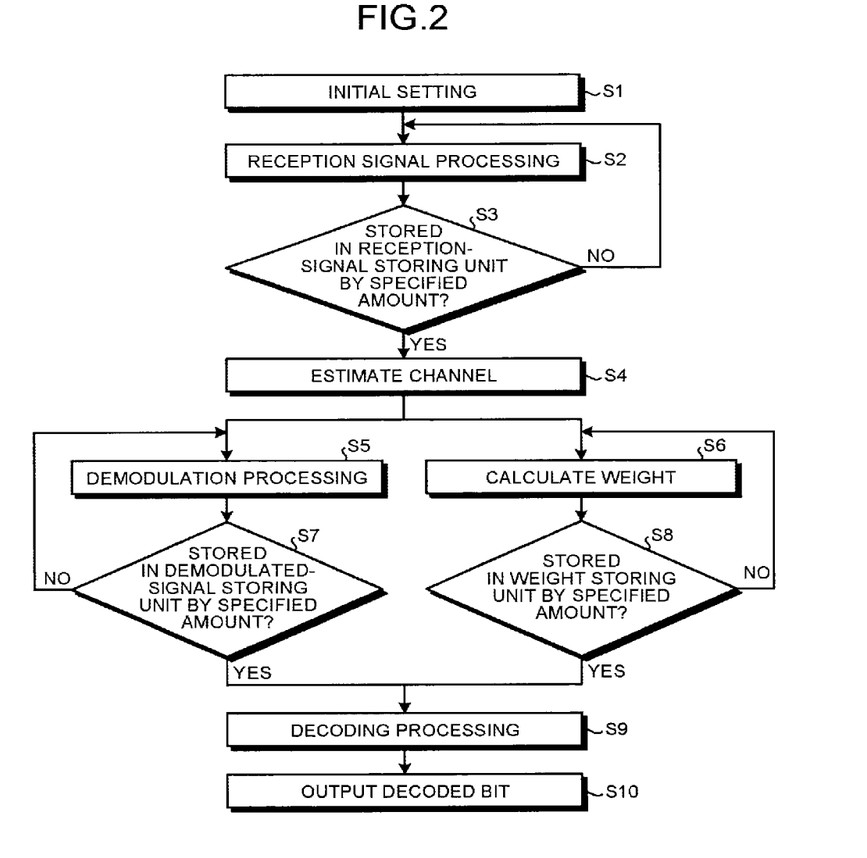
FIG. 2 is a flowchart for explaining an example of a reception processing procedure in the first embodiment.

FIG. 2 is a flowchart for explaining an example of a reception processing procedure in this embodiment. First, the units of the receiving apparatus perform initial setting (step S1). The reception processing unit 2 applies reception processing (reception signal processing) to a reception signal (step S2). When a predetermined amount of the reception signal is stored in the storing unit 3-1 (No at step S3), the control unit 7 returns to step S2.

When the predetermined amount of the reception signal is stored in the storing unit 3-1 (Yes at step S3), the control unit 7 instructs the storing unit 3-1 to output the reception signal. The transmission-line estimating unit 4 carries out transmission line estimation (step S4). Demodulation processing (step S5) by the demodulation processing unit 5 and weight calculation (step S6) by the weight calculating unit 6 are carried out in parallel. The control unit 7 determines whether a specified amount of a demodulated signal is stored in the storing unit 3-2 (step S7). When the specified amount of the demodulated signal is stored (Yes at step S7), the control unit 7 controls the storing unit 3-2 to output the demodulated signal and proceeds to step S9.

The control unit 7 determines whether a specified amount of weight is stored in the storing unit 3-3 (step SB). When the specified amount of the weight is stored (Yes at step S8), the control unit 7 controls the storing unit 3-3 to output the weight and proceeds to step S9. When the specified amount of the demodulated signal is not stored at step S7 (No at step S7), the control unit 7 returns to step S5. When the specified amount of the weight is not stored at step S8 (No at step S8), the control unit 7 returns to step S6.

At step S9, the decoding unit 8 carries out decoding processing using the input demodulated signal and the input weight (step S9) and outputs a decoded bit as a decoding result (step S10).

According to the processing explained above, the control unit 7 can input the specified amount of the weight and the specified amount of the demodulated signal (e.g., the weight and the demodulated signal equivalent to a predetermined number of SC symbols) to the decoding unit 8. The decoding unit 8 can perform decoding using the specified amount of the weight and the specified amount of the demodulated signal.

As explained above, in this embodiment, the weight is calculated on the basis of the transmission line estimation value and, during the decoding, the decoding processing is performed using the LLR value multiplied with the weight. Therefore, even in the transmission line in which time fluctuation is conspicuous, it is possible to perform weighting according to a state of the transmission line and improve the decoding characteristic.

Second Embodiment

Figure 3:
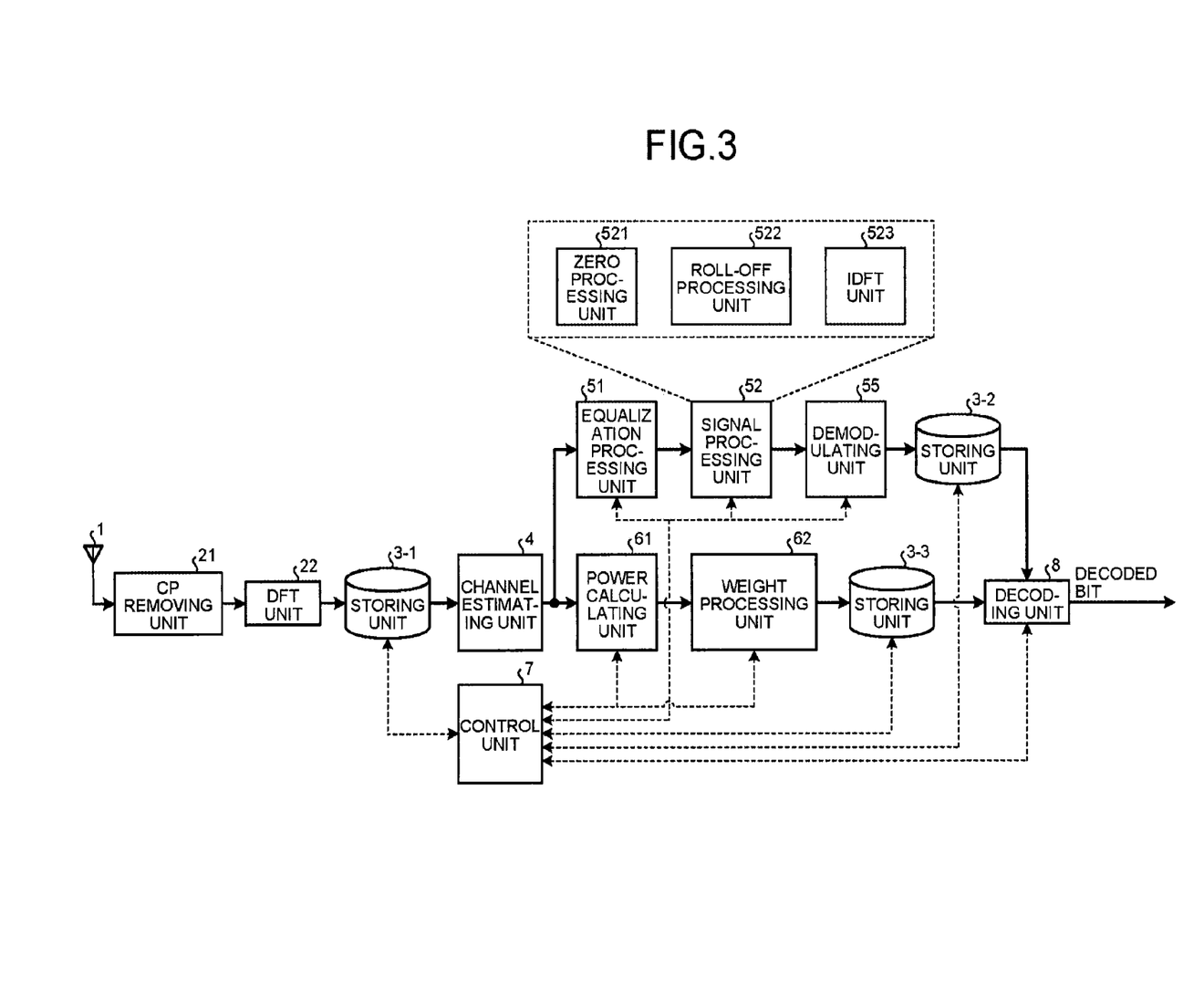
FIG. 3 is a diagram of a functional configuration example of a receiving apparatus in a second embodiment.

FIG. 3 is a diagram of a functional configuration example of a second embodiment of the receiving apparatus according to the present invention. In this embodiment, as an example of the receiving apparatus, a receiving apparatus that receives a signal (an SC block signal) generated by an SC block transmission system is explained.

The receiving apparatus in this embodiment includes the reception antenna 1, a CP removing unit 21, a DET unit 22, the storing units 3-1 to 3-3, the transmission-line estimating unit 4, an equalization processing unit 51, a signal processing unit 52, a demodulating unit 55, a power calculating unit 61, a weight processing unit 62, the control unit 7, and the decoding unit 8. The signal processing unit 52 includes a zero processing unit 521, a roll-off processing unit 522, and an IDFT unit 523. Components having functions same as those in the first embodiment are denoted by reference numerals and signs same as those in the first embodiment. Redundant explanation of the components is omitted.

Figure 4:
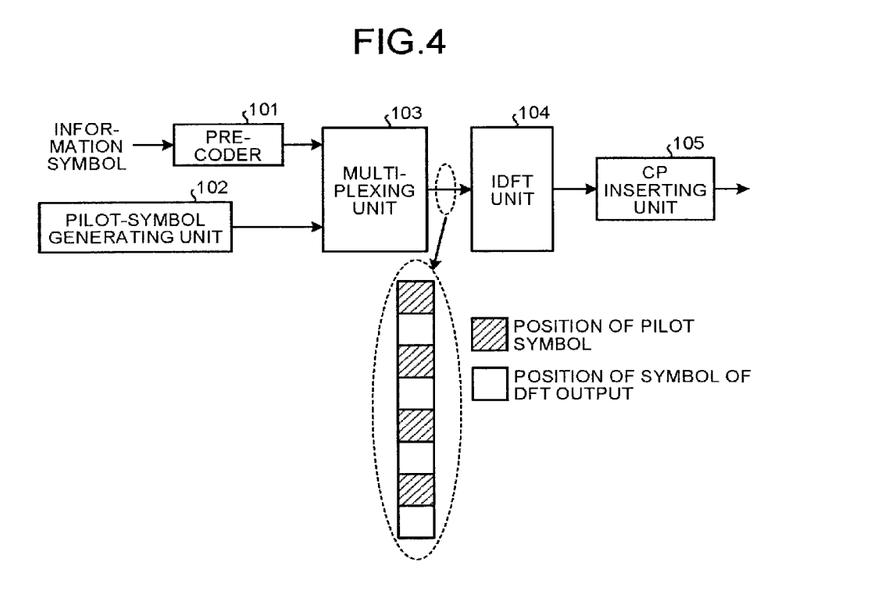
FIG. 4 is a diagram of a functional configuration example of a transmitting apparatus that transmits an SC block signal.

FIG. 4 is a diagram of a functional configuration example of a transmitting apparatus that transmits the SC block signal. The transmitting apparatus includes a pre-coder 101 that applies pre-coding processing such as DFT to an information symbol, a pilot-symbol generating unit 102 that generates a pilot symbol, and a multiplexing unit 103 that multiplexes the pilot symbol and an information symbol after the pre-coding processing. Further, the transmitting apparatus includes an IDFT unit 104 that converts a signal after the multiplexing into a time domain signal with IDFT processing and a CP inserting unit 105 that inserts a CP into the time domain signal. In FIG. 4, an example of positions of pilot symbols in a signal input to the IDFT unit 104 is shown. However, the positions of the pilot symbols are not limited to this. Note that the transmitting apparatus that transmits the SC block signal received by the receiving apparatus in this embodiment is not limited to the example shown in FIG. 4.

The operation of the receiving apparatus in this embodiment is explained below. A signal received from the reception antenna 1 is subjected to CP removal by the CP removing unit 21 and DFT processing by the DFT unit 22 and stored in the storing unit 3-1. When a predetermined amount of the reception signal is accumulated in the storing unit 3-1, the reception signal is output according to control from the control unit 7. Transmission line estimation is carried out by the transmission-line estimating unit 4. The transmission-line estimating unit 4 inputs a transmission line estimation value to the equalization processing unit 51 and the power calculating unit 61.

The equalization processing unit 51 carries out frequency domain equalization processing using the input transmission line estimation value and inputs a signal after the processing to the zero processing unit 521. The zero processing unit 521 removes a zero carrier (an unused frequency band) from the input signal and inputs a signal after the zero carrier removal to the roll-off processing unit 522. The roll-off processing unit 522 carries out roll-off filter processing on the input signal and inputs a signal after the processing to the IDFT unit 523. The IDFT unit 523 carries out IDFT processing on the input signal and inputs a signal after the processing to the demodulating unit 55. The demodulating unit 55 carries out demodulation processing using the input signal and stores a demodulated signal in the storing unit 3-2.

On the other hand, the power calculating unit 61 calculates electric power of carriers in a frequency domain on the basis of the input transmission line estimation value. The weight processing unit 62 calculates weight on the basis of information concerning the carrier electric power on a frequency and reliability and stores the weight in the storing unit 3-3. In this embodiment, because the electric power is calculated from the transmission line estimation value in the frequency domain, it is also possible to accurately calculate electric power of the carriers in a multipath fading environment.

Figure 5:
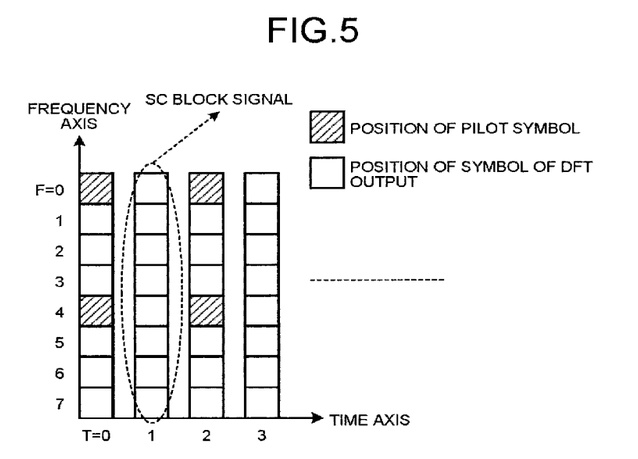
FIG. 5 is a diagram of an example of a pilot and data symbol arrangement.

FIG. 5 is a diagram of an example of a pilot and data symbol arrangement. In FIG. 5, the abscissa is a time axis and the ordinate is a frequency axis. In FIG. 5, as an example, eight carriers are used. Pilot symbols for transmission line estimation is periodically arranged on a frequency. SC block signals including the pilot symbols are periodically arranged on time. In the example shown in FIG. 5, the SC block signals including the pilot symbols are arranged at every other symbol.

Figure 6:
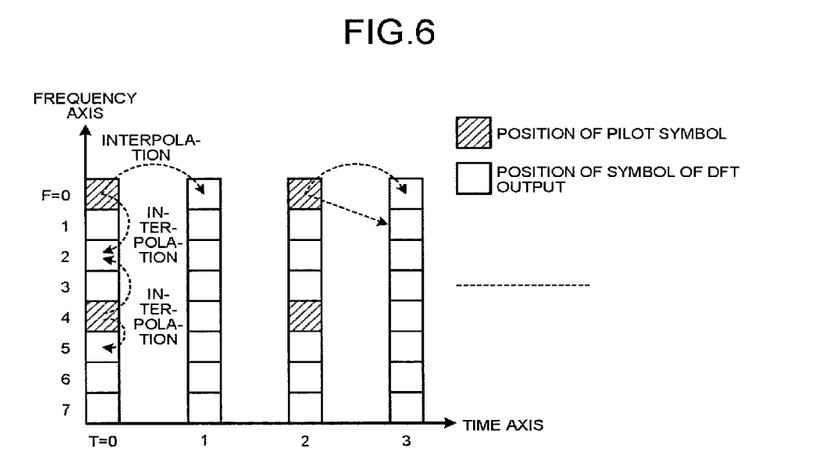
FIG. 6 is a diagram for explaining a concept of interpolation of transmission line estimation values of carriers of data symbols.

In the case of the arrangement of the pilot symbols shown in FIG. 5, as shown in FIG. 6, transmission line estimation values of carriers of the data symbols are estimated by interpolation using an estimation value obtained using the pilot symbol. FIG. 6 is a diagram for explaining a concept of the interpolation for the transmission line estimation values of the carriers of the data symbols. Note that various methods are generally used as a method of correcting the transmission line estimation values of the carriers of the data symbols using the pilot symbols. Any method can be used.

As a specific example of the weight calculation, a value of a transmission line of a jth carrier in a symbol of an ith SC block signal is represented as $h_{i,j}$. The value of the transmission line can be obtained using the pilot symbols and the like.

Figure 7:
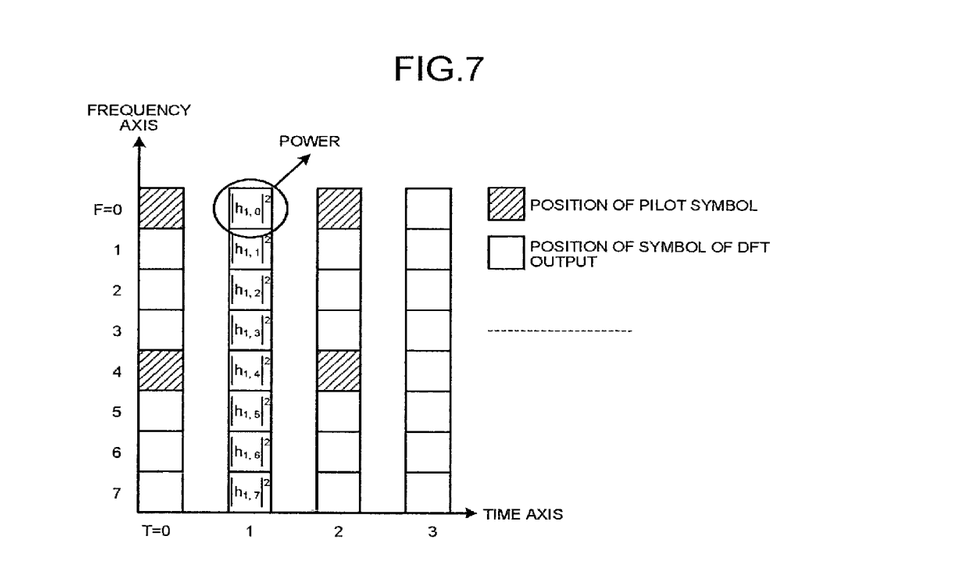
FIG. 7 is a diagram of a relation between the transmission line estimation values and electric power.

FIG. 7 is a diagram of an example of a relation between transmission line estimation values and electric power. As shown in FIG. 7, when $h_{i,j}^*$ is assumed to be conjugation of $h_{i,j}$, electric power can be represented by Formula (4) below.

[Math. 4]

$$|h_{i,j}|^2 = h_{i,j} \times h_{i,j}^* \quad (4)$$

Weight for the symbol of the ith SC block signal is represented as $w_i$. The weight $w_i$ can be calculated in any way by the weight processing unit 62 as long as information concerning carrier power on a frequency and reliability are reflected. For example, if one SC block symbol is formed by N (N is an integer equal to or larger than 1) carriers, a power average of the N carriers, which are all carriers, can be set as $w_i$ as indicated by Formula (5) below. Maximum power in all the carriers can be set as $w_i$ as indicated by Formula (6) below. Minimum power in all the carriers can be set as $w_i$ as indicated by Formula (7) below.

[Math. 5]

$$w_i = \frac{1}{N} \sum_{j=1}^{N} |h_{i,j}|^2 \quad (5)$$

[Math. 6]

$$w_i = \max |h_{i,j}|^2 \ 1 \leq j \leq N \quad (6)$$

[Math. 7]

$$w_i = \min |h_{i,j}|^2 \ 1 \leq j \leq N \quad (7)$$

Figure 8:
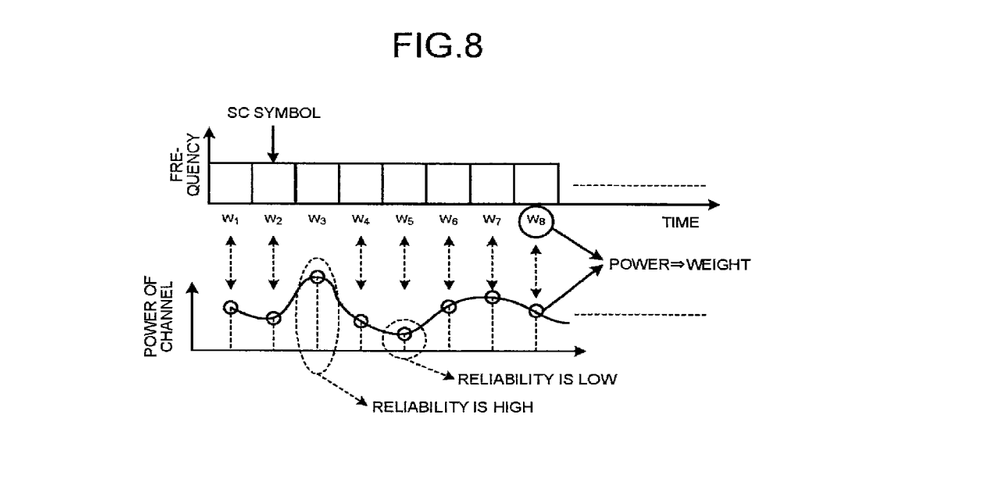
FIG. 8 is a diagram of an example of a relation between weights and electric power of each of transmission lines at the time when the weights are calculated on the basis of the electric power.

When the weight is calculated as explained above, weight that changes together with time is obtained. FIG. 8 is a diagram of an example of a relation between weights and electric power of each of transmission lines at the time when the weights are calculated on the basis of electric power. In FIG. 8, time is plotted on the abscissa. An example of weights (weights calculated using electric power calculated on the basis of transmission line estimation values) $w_1, w_2, \ldots$ and electric power of the transmission line is shown in SC symbol units. As shown in FIG. 8, if the weights are calculated such that values of the weights are large at times when the electric power is high, values of the weights of symbols with high electric power, i.e., high reliability can be increased. A decoding result with high reliability can be obtained.

In this embodiment, the power calculating unit 61 and the weight processing unit 62 correspond to the weight calculating unit 6 in the first embodiment. The equalization processing unit 51, the signal processing unit 52, and the demodulating unit 55 corresponds to the demodulation processing unit 5 in the first embodiment. Therefore, in this embodiment, in the procedure explained with reference to FIG. 2 in the first embodiment, the processing by the equalization processing unit 51, the signal processing unit 52, and the demodulating unit 55 is carried out at step S5. The processing by the power calculating unit 61 and the weight processing unit 62 is carried out at step S6.

Note that the CP removing unit does not have to be provided when the CP is not inserted into the SC block signal on the transmission side. When zero padding is carried out on the SC block signal on the transmission side, a zero removing unit that removes zero can be provided instead of the CP removing unit.

In this embodiment, at time when a transmission line with high electric power is generated, the weight multiplied with the LLR has a high value, that is, a decoding result with high reliability can be obtained. Because the weight calculated on the basis of the electric power of the transmission line is reflected on the LLR value during the decoding in this way, an excellent decoding characteristic can be obtained. The decoding is performed collectively for a plurality of SC block symbols. Therefore, when the example shown in FIG. 8 is used, the decoding is performed using data including various reliabilities according to electric powers. Therefore, diversity is obtained and the decoding characteristic is improved.

Third Embodiment

Figure 9:
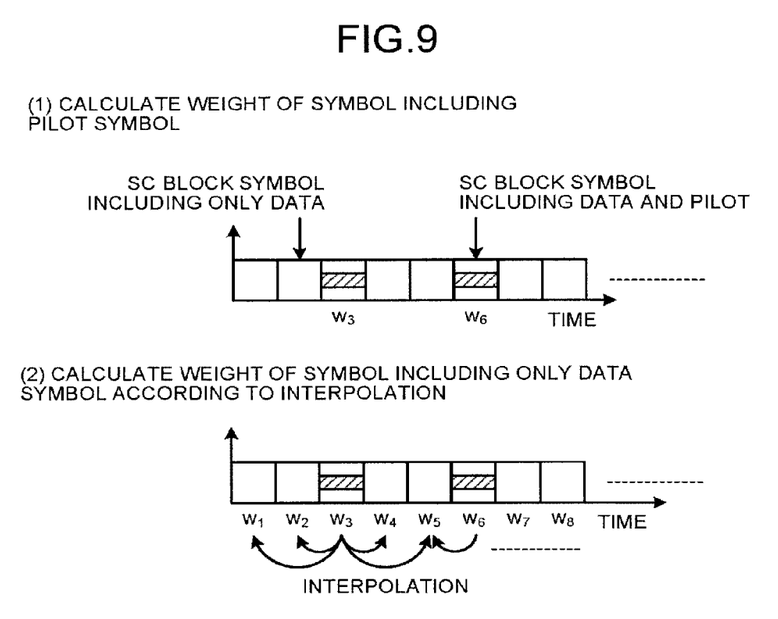
FIG. 9 is a diagram of an example of a calculation method for weight in a third embodiment.

FIG. 9 is a diagram of an example of a calculation method for weight in a third embodiment according to the present invention. The configuration of a receiving apparatus in this embodiment is the same as the configuration of the receiving apparatus in the second embodiment.

In the second embodiment, values of the transmission line $h_{i,j}$ of all the carriers are estimated, electric power $|h_{i,j}|^2$ of the carriers is calculated, and weights are calculated on the basis of the calculated electric power. In this embodiment, weights are calculated using electric powers of SC block symbols including pilot symbols. Weights of SC block symbols including only data symbols are calculated by interpolation. As shown in FIG. 9(1), weights $w_3$ and $w_6$ of the SC block symbols including the pilot symbols are calculated. Subsequently, other weights are calculated using $w_3$ and $w_6$ by interpolation (FIG. 9(2)). As an interpolation method, any method can be used. Operations in this embodiment other than the operations explained above are the same as those in the second embodiment.

As explained above, in this embodiment, weights are calculated using electric powers of the SC block symbols including the pilot symbols. Weights of the SC block symbols including only the data symbols are calculated by interpolation. Therefore, it is possible improve the decoding characteristic with a low operation amount.

Fourth Embodiment

Figure 10:
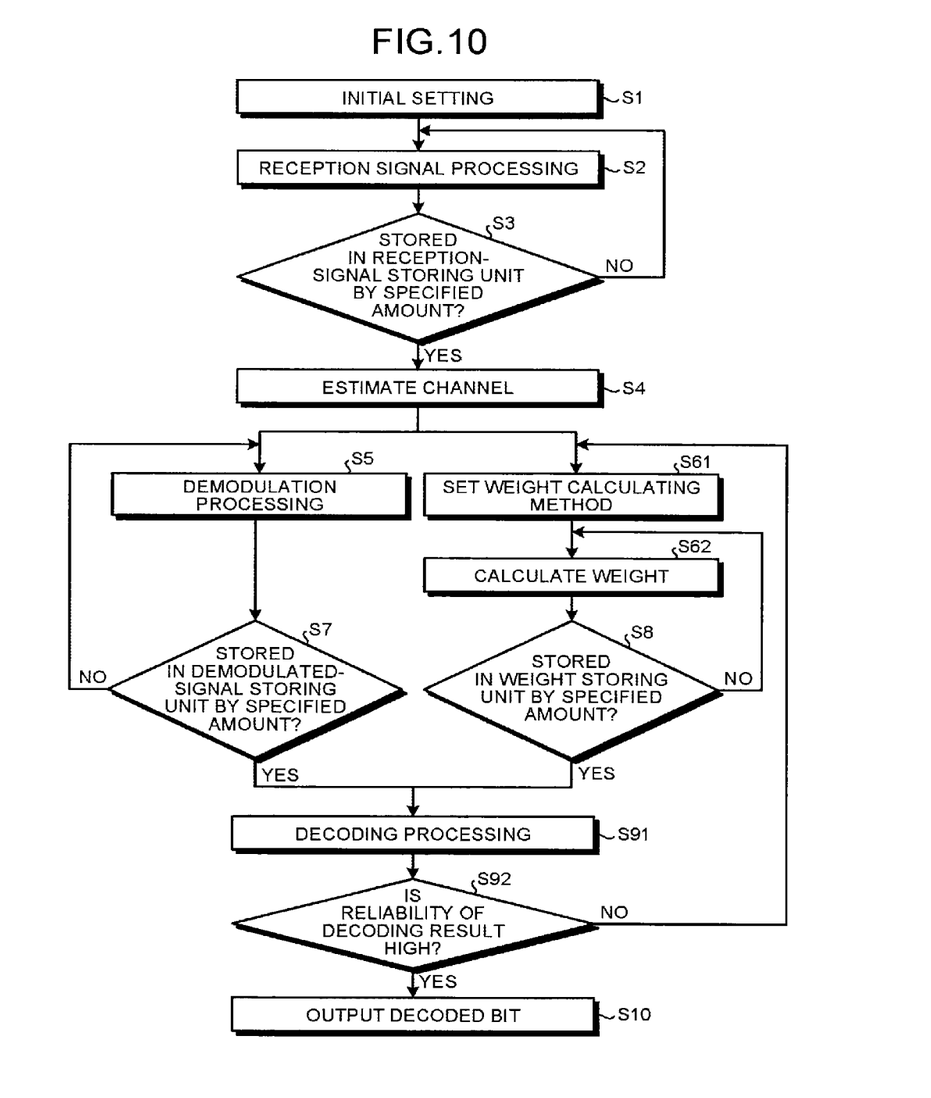
FIG. 10 is a flowchart for explaining an example of a reception processing procedure in a fourth embodiment.

FIG. 10 is a flowchart for explaining an example of a reception processing procedure in a fourth embodiment according to the present invention. The configuration of a receiving apparatus according to this embodiment is the same as the configuration of the receiving apparatus in the second embodiment.

The control unit 7 controls the operations of the storing units and the units. Therefore, the control unit 7 can also adaptively change a weight calculating method. For example, when there is little change in transmission line fluctuation, an excessive operation amount is necessary if the weight calculation is performed for each of SC block symbols. Therefore, the control unit 7 can perform control to write values in the past in the storing unit 3-3. The control unit 7 can also determine, on the basis of, for example, a value indicating reliability of a decoded bit output from the decoding unit 8, whether weight calculation processing in use is effective and change the calculation method.

FIG. 10 is a flowchart in setting a weight calculating method on the basis of reliability of a decoding result. Step S1 to step S5 and step S7 are the same as the steps in the first embodiment. The control unit 7 sets a weight calculating method for the power calculating unit 61 and the weight processing unit 62 (step S61). Weight calculation is performed by the power calculating unit 61 and the weight processing unit 62 (step S62). Step S8 same as the step in the first embodiment is carried out.

When the specified amount of the demodulated signal is stored in the storing unit 3-2 (Yes at step S7) and when the specified amount of the weight is stored in the storing unit 3-3 (Yes at step S8), the decoding unit 8 performs the decoding processing and notifies the control unit 7 of reliability (step S91). The control unit 7 determines whether the reliability notified from the decoding unit 8 is high (equal to or higher than a predetermined value) (step S92). When the reliability is high (Yes at step S92), the control unit 7 outputs a decoded bit (step S10). When the reliability is not high (No at step S92), the control unit 7 returns to step S61 and sets a weight calculating method again. The weight calculating method in this case can designate which of an average, a maximum, and a minimum of electric powers is used as weight or can designate which of the following is used: calculating electric powers of all the carriers and then calculating weight as explained in the second embodiment; and calculating weight using electric powers of the SC block symbols including the pilot symbols and calculating weight by interpolation as explained in the third embodiment. The weight calculating method can designate other settings.

When weight is calculated using a value other than the electric power, the receiving apparatus can further include a weight calculating unit separately from the power calculating unit 61 and the weight processing unit 62. The control unit 7 can select which of the weight calculating unit and the power calculating unit 61 and the weight processing unit 62 is used.

As explained above, in this embodiment, the control unit 7 sets the weight calculating method on the basis of, for example, the reliability of the decoding result. Therefore, it is possible to set an optimum weight calculating method according to a state and improve the decoding characteristic.

In the second, third, and fourth embodiments, the example is explained in which the SC transmission is performed. However, the present invention is not limited to the SC transmission and can be applied to receiving apparatuses of various systems including a wired system. Concerning the content of the weight calculation, calculation of an average, a maximum, and a minimum is explained. However, the content is not limited to the average, the maximum, and the minimum.

INDUSTRIAL APPLICABILITY

As explained above, the receiving apparatus and the receiving method according to the present invention are useful for a digital communication system and, in particular, suitable for a communication system that performs SC block transmission.

REFERENCE SIGNS LIST

1 Reception antenna
2 Reception processing unit
3-1, 3-2, 3-3 Storing units
4 Transmission-line estimating unit
5 Demodulation processing unit
6 Weight calculating unit
7 Control unit
8 Decoding unit
51 Equalization processing unit
52 Signal processing unit
55 Demodulating unit
61 Power calculating unit
62 Weight processing unit
521 Zero processing unit
522 Roll-off processing unit
523 IDFT unit

The invention claimed is:

1. A receiving apparatus comprising:
    a channel estimator configured to calculate a channel estimation value from a reception signal of a single carrier block;
    a demodulator configured to receive the channel estimation value and perform demodulation processing on the basis of the channel estimation value;
    a weight calculator configured to calculate a weight of a carrier on a frequency of the single carrier block from the channel estimation value and calculates weight of the single carrier block on the basis of the weight of the carrier on the frequency; and
    a decoder configured to receive the weight of the single carrier block and perform decoding on the basis of a demodulation result by the demodulator and the received weight.

2. The receiving apparatus according to claim 1, further comprising:
    a CP remover configured to remove a cyclic prefix included in the reception signal; and
    a DFT processor configured to apply DFT processing to the reception signal after the cyclic prefix removal,
    wherein the channel estimator calculates the channel estimation value by using the reception signal after the DFT processing.

3. The receiving apparatus according to claim 1, further comprising:
    a zero remover configured to remove zero padding included in the reception signal; and
    a DFT processor configured to apply DFT processing to the reception signal after the zero padding removal,
    wherein the channel estimator calculates the channel estimation value by using the reception signal after the DFT processing.

4. The receiving apparatus according to claim 2, wherein the demodulator includes:
    an equalization processor configured to apply frequency domain equalization to the reception signal after the DFT processing;
    a zero processor configured to remove a signal in an unused frequency band;
    a roll-off processor configured to perform roll-off filter processing;

an IDFT processor configured to apply IDFT processing to a signal after the roll-off filter processing; and
a demodulator that demodulates a signal after the IDFT processing.

5. The receiving apparatus according to claim 3, wherein the demodulator includes:
an equalization processor configured to apply frequency domain equalization to the reception signal after the DFT processing;
a zero processor configured to remove a signal in an unused frequency band;
a roll-off processor configured to perform roll-off filter processing;
an IDFT processor configured to apply IDFT processing to a signal after the roll-off filter processing; and
a demodulator that demodulates a signal after the IDFT processing.

6. The receiving apparatus according to claim 1, wherein the weight calculator includes:
a power calculator configured to obtain electric powers of each carrier on the basis of the channel estimation value, wherein the weight of the single carrier block is calculated on the basis of the electric powers.

7. The receiving apparatus according to claim 1,
wherein the weight calculator is adaptable to a plurality of methods as a calculation method for the weight, and
the receiving apparatus further comprises a controller configured to select one of the plurality of methods on the basis of reliability obtained by the decoding processing by the decoder, and to set the selected one method in the weight calculator.

8. The receiving apparatus according to claim 7, wherein
the controller selects a first method from the plurality of methods and sets the first method in the weight calculator,
when the reliability obtained in the case of the first method is less than a threshold value, the controller selects a second method other than the first method from the plurality of methods and sets the second method in the weight calculator, and
the decoder performs the decoding based on the demodulation result and the received weight of the single carrier block obtained by the weight calculator using the second method.

9. The receiving apparatus according to claim 1,
wherein the weight calculator calculates respective weights for a plurality of carriers on a frequency of the single carrier block, and calculates, as the weight of the single carrier block, a maximum value of the respective weights.

10. The receiving apparatus according to claim 1,
wherein the weight calculator calculates respective weights for a plurality of carriers on a frequency of the single carrier block, and calculates, as the weight of the single carrier block, a minimum value of the respective weights.

11. A receiving method comprising:
calculating a channel estimation value from a reception signal of a single carrier block;
performing demodulation processing on the basis of the channel estimation value;
calculating a weight of a carrier on a frequency of the single carrier block from the channel estimation value, and calculating a weight of the single carrier block on the basis of the weight of the carrier on the frequency; and
receiving, by a decoder, the weight of the single carrier block and performing decoding on the basis of a demodulation result by the demodulation processing and the received weight.

12. The method according to claim 11, comprising:
removing a cyclic prefix included in the signal;
applying DFT processing to the reception signal after the cyclic prefix removal; and
calculating the channel estimation value by using the reception signal after the DFT processing.

13. The method according to claim 12, wherein the demodulating processing includes:
applying frequency domain equalization to the reception signal after the DFT processing;
removing a signal in an unused frequency band;
performing roll-off filter processing;
applying IDFT processing to a signal after the roll-off filter processing; and
demodulating a signal after the IDFT processing.

14. The method according to claim 11, comprising:
removing zero padding included in the signal;
applying DFT pocessing to the reception signal after the zero padding removal; and
calculating the channel estimation value by using the reception signal after the DFT processing.

15. The method according to claim 14, wherein the demodulating processing includes:
applying frequency domain equalization to the reception signal after the DFT processing;
removing a signal in an unused frequency band;
performing roll-off filter processing;
applying IDFT processing to a signal after the roll-off filter processing; and
demodulating a signal after the IDFT processing.

16. The method according to claim 11, wherein calculating the weight comprises:
obtaining electric powers of each carrier on the basis of the channel estimation value; and
calculating the weight of the single carrier block on the basis of the electric powers.

17. The method according to claim 11, wherein:
calculating the weight is adaptable to a plurality of methods; and
one of the plurality of methods is selected on the basis of reliability obtained by the decoding processing, and is set in calculating the weight.

18. The method according to claim 17, further comprising:
selecting a first method from the plurality of methods and setting the first method in the calculating the weight;
selecting, if the reliability obtained in the case of the first method is less than a threshold value, a second method other than the first method from the plurality of methods and setting the second method in the calculating the weight; and
performing the decoding based on the demodulation result and the received weight of the single carrier block obtained by using the second method.

19. The method according to claim 11, wherein the calculating the weight comprises:
calculating respective weights for a plurality of carriers on a frequency of the single carrier block; and
calculating, as the weight of the single carrier block, a maximum value of the respective weights.

20. The method according to claim 11, wherein the calculating the weight comprises:
calculating respective weights for a plurality of carriers on a frequency of the single carrier block; and
calculating, as the weight of the single carrier block, a minimum value of the respective weights.

* * * * *